(12) United States Patent
Tanaka et al.

(10) Patent No.: US 8,145,781 B2
(45) Date of Patent: Mar. 27, 2012

(54) DATA DISTRIBUTION SYSTEM

(75) Inventors: Ryuta Tanaka, Kawasaki (JP); Takashi Hamano, Kawasaki (JP); Atsuko Tada, Kawasaki (JP); Jouji Uemura, Osaka (JP); Futoshi Nakamori, Osaka (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 12/289,332

(22) Filed: Oct. 24, 2008

(65) Prior Publication Data

US 2009/0172164 A1    Jul. 2, 2009

(30) Foreign Application Priority Data

Dec. 27, 2007  (JP) ................................ 2007-335491

(51) Int. Cl.
*G06F 15/173* (2006.01)

(52) U.S. Cl. ......................... 709/231; 709/229; 370/235

(58) Field of Classification Search .................. 709/221, 709/223, 231, 229; 370/230.1, 231, 235
See application file for complete search history.

(56) References Cited

U.S. PATENT DOCUMENTS

| | | | |
|---|---|---|---|
| 7,027,403 B2 * | 4/2006 | Porikli et al. ................. | 370/238 |
| 7,027,407 B2 | 4/2006 | Diepstraten et al. | |
| 7,593,348 B2 * | 9/2009 | Kodialam et al. ............. | 370/254 |
| 7,689,693 B2 * | 3/2010 | Doshi et al. ................... | 709/226 |
| 7,701,856 B2 * | 4/2010 | Marcondes et al. .......... | 370/235 |
| 7,990,978 B1 * | 8/2011 | Chamas et al. .......... | 370/395.21 |
| 2006/0007947 A1 | 1/2006 | Li et al. | |
| 2009/0129405 A1 * | 5/2009 | Lauwers et al. .............. | 370/468 |
| 2009/0198829 A1 * | 8/2009 | Sengupta et al. ............. | 709/233 |

FOREIGN PATENT DOCUMENTS

| | | |
|---|---|---|
| JP | 2001-237858 | 8/2001 |
| JP | 2006-25408 | 1/2006 |

OTHER PUBLICATIONS

Miguel Castro et al., "SplitStream: High-bandwidth content distribution in cooperative environments", pp. 1-6, Feb. 2003.
Venkata N. Padmanabhan et al, "Resilient Peer-to-Peer Streaming", IEEE International Conference on Network Protocols (ICNP), Atlanta, GA, SA, Nov. 2003. 12 pages.

* cited by examiner

*Primary Examiner* — Kevin Bates
(74) *Attorney, Agent, or Firm* — Staas & Halsey LLP

(57) ABSTRACT

A data distribution system can select paths easily with flexibility when paths are generated. In the data distribution system, a management device includes a node bandwidth information acquisition unit to acquire and hold information on data transmission-enabled bandwidth of each of the plurality of nodes on the network; a content rate acquisition unit to acquire and hold a bandwidth for content to be distributed; a bandwidth splitting information acquisition unit to acquire and hold bandwidth splitting information, which is a splitting ratio to split the content to be distributed into a plurality of bandwidths; and a connection destination decision unit to determine a connection destination of the content to be distributed, which is split based on the bandwidth split information being held in the bandwidth splitting information acquisition unit.

13 Claims, 14 Drawing Sheets

| NODE | 4Mbps | 3Mbps | 2Mbps | 1Mbps | |
|---|---|---|---|---|---|
| A | 5 | 0 | 0 | 0 | =20 |
| B | 2 | 0 | 1 | 0 | =10 |
| C | 0 | 1 | 0 | 0 | =3 |
| D | 1 | 0 | 0 | 1 | =5 |
| E | 0 | 0 | 1 | 0 | =2 |

| NODE | 4Mbps | 3Mbps | 2Mbps | 1Mbps |
|------|-------|-------|-------|-------|
| A | 4 | 0 | 0 | 0 |
| B | 0 | 0 | 1 | 0 |
| C | 0 | 1 | 0 | 0 |
| D | 0 | 0 | 0 | 1 |
| E | 0 | 0 | 1 | 0 |

| NODE | 4Mbps | 3Mbps | 2Mbps | 1Mbps |
|------|-------|-------|-------|-------|
| A | 1 | 4 | 0 | 0 |
| B | 0 | 0 | 1 | 0 |
| C | 0 | 1 | 0 | 0 |
| D | 0 | 0 | 0 | 1 |
| E | 0 | 0 | 1 | 0 |

FIG.9

| NODE | 4Mbps | 3Mbps | 2Mbps | 1Mbps |
|---|---|---|---|---|
| A | 1 | 1 | 0 | 0 |
| B | 0 | 0 | 1 | 0 |
| C | 0 | 0 | 0 | 0 |
| D | 0 | 0 | 0 | 1 |
| E | 0 | 0 | 1 | 0 |

FIG.10

| NODE | 4Mbps | 3Mbps | 2Mbps | 1Mbps |
|---|---|---|---|---|
| A | 0 | 1 | 2 | 0 |
| B | 0 | 0 | 1 | 0 |
| C | 0 | 0 | 0 | 0 |
| D | 0 | 0 | 0 | 1 |
| E | 0 | 0 | 1 | 0 |

| NODE | 4Mbps | 3Mbps | 2Mbps | 1Mbps |
|---|---|---|---|---|
| A | 0 | 1 | 0 | 0 |
| B | 0 | 0 | 0 | 0 |
| C | 0 | 0 | 0 | 0 |
| D | 0 | 0 | 0 | 1 |
| E | 0 | 0 | 0 | 0 |

| NODE | 4Mbps | 3Mbps | 2Mbps | 1Mbps |
|---|---|---|---|---|
| A | 0 | 0 | 0 | 3 |
| B | 0 | 0 | 0 | 0 |
| C | 0 | 0 | 0 | 0 |
| D | 0 | 0 | 0 | 1 |
| E | 0 | 0 | 0 | 0 |

| NODE | 4Mbps | 3Mbps | 2Mbps | 1Mbps |
|---|---|---|---|---|
| A | 0 | 0 | 0 | 0 |
| B | 0 | 0 | 0 | 0 |
| C | 0 | 0 | 0 | 0 |
| D | 0 | 0 | 0 | 0 |
| E | 0 | 0 | 0 | 0 |

| NODE | 8 Mbps | 4 Mbps | 2 Mbps | 1 Mbps | |
|---|---|---|---|---|---|
| A | 3 | 1 | 1 | 0 | =30 |
| B | 2 | 0 | 0 | 0 | =16 |
| C | 0 | 0 | 1 | 0 | =2 |
| D | 0 | 0 | 0 | 1 | =1 |
| E | 1 | 0 | 1 | 1 | =11 |

| NODE | 8 Mbps | 4 Mbps | 2 Mbps | 1 Mbps | |
|---|---|---|---|---|---|
| A | 2 | 1 | 1 | 0 | =30 |
| B | 0 | 0 | 0 | 0 | =16 |
| C | 0 | 0 | 1 | 0 | =2 |
| D | 0 | 0 | 0 | 1 | =1 |
| E | 0 | 0 | 1 | 1 | =11 |

| NODE | 8 Mbps | 4 Mbps | 2 Mbps | 1 Mbps |
|------|--------|--------|--------|--------|
| A | 0 | 0 | 0 | 0 |
| B | 0 | 0 | 0 | 0 |
| C | 0 | 0 | 0 | 0 |
| D | 0 | 0 | 0 | 0 |
| E | 0 | 0 | 0 | 0 |

DATA DISTRIBUTION SYSTEM

CROSS-REFERENCE TO RELATED APPLICATION

This application is based upon and claims the benefit of priority of the prior Japanese Patent Application No. 2007-335491, filed on Dec. 27, 2007, the entire contents of which are incorporated herein by reference.

FIELD

The present invention described herein is related to a data distribution (streaming distribution) system based on a peer-to-peer network, and a management device applied thereto.

BACKGROUND

In the field of communication system which performs data distribution, a client-server type communication format, in which one server distributes data simultaneously to a plurality of clients, is used. In the case of this communication format, if the number of client terminals which receive data increases, load in proportion to this increase is generated and concentrated on the server side.

Therefore, in a large scale data distribution system, it is essential to reinforce the servers and network infrastructure where access concentrates, and this causes problems in terms of cost.

Given this background, data distribution applying P2P technology is currently receiving attention. P2P type distribution is implemented by a terminal which receives data, relaying the received data to another terminal, continuing the relay distribution sequentially. Hence an increase in load on the server is mild or has negligible influence even if the number of client terminals increase.

P2P type distribution is normally data distribution which is transparent to the physical network connection environment, and is regarded as data distribution on a logical network (overlay network) created by logical links among terminals.

In the case of P2P based data distribution, on the other hand, a critical point is how effectively the transfer bandwidth of the terminal (node), which relays data, is used.

In a distribution network system, an improvement in distribution performance of the entire system can be expected as the number of relay terminals to relay data becomes greater, and as the usage efficiency of the relay performance (data transfer bandwidth) of the relay terminals becomes higher.

The ratio of the relay terminals to all the terminals in a distribution network system and the usage efficiency of the transfer bandwidth of each relay terminal are determined by how distribution paths are generated.

Data distribution can be classified into non-real-time distribution and real-time distribution, and whether real-time-ness is appropriate or not is determined depending on the distribution path generation method and the data distribution method on the path.

A distribution path has many format variations, including a tree structure and a mesh structure. Generally the distribution path is represented by a graph, with terminals as nodes and communication links between terminals as edges.

In the case of data distribution using a simple distribution path based on a single tree, the number of nodes to be "leaves" (nodes which are not related to relaying data) inevitably increases, so as a whole the usage efficiency of bandwidth owned by the nodes drops, and load on the relay nodes increases.

Conversely for a technology to distribute data using a single tree type distribution path, a technology to distribute data using a plurality of trees is disclosed in Split Stream High-bandwidth Content Distribution in a Cooperative Environment, IPTPS, February 2003, M. Castro, P. Druschel, et al (Microsoft), also in IEEE International Conference on Network Protocols (ICNP), Atlanta, Ga., SA, November 2003, V. N. Padmanabhan et al (Microsoft), and in Japanese Patent Laid-Open Publication NO. 2006-25408. The technology referred to as "Split Stream" shown in Split Stream: High-bandwidth Content Distribution in a Cooperative Environment, IPTPS, February 2003, M. Castro, P. Druschel, et al (Microsoft) is a data distribution system using a plurality of paths, wherein bandwidth B of the data is equally divided into k parts, nodes relay data only in one tree out of the distribution trees at every B/k, and receive data as leaf nodes in other trees.

IEEE International Conference on Network Protocols (ICNP), Atlanta, Ga., SA, November 2003, V. N. Padmanabhan et al (Microsoft) shows a prior art called "Coop Net". In the case of the Coop Net disclosed in IEEE International Conference on Network Protocols (ICNP), Atlanta, Ga., SA, November 2003, V. N. Padmanabhan et al (Microsoft), the above mentioned Split Stream is used when content is distributed over a P2P network, where the data bandwidth is equally divided into a plurality of bandwidths, and data is distributed via a plurality of distribution trees respectively, and trees are managed.

The technology disclosed in Japanese Patent Laid-Open publication NO. 2006-25408 is a technology that targets maximizing the bandwidth usage efficiency of each terminal and the elimination of leaf nodes.

FIG. 1 is a drawing shown in Japanese Patent Laid-Open Publication NO. 2006-25408 (FIG. 5), depicting this technology, where the distribution data at a distribution source S is divided into unit data, and unit data is sequentially transmitted in each node t1 to t4. Each node which received the unit data transfer the received data to all the nodes other than itself, and the next data is sent to the node which finished the data transfer from the distribution source S.

By repeating this processing, each node t1 to t4 always plays a role of a relay, while transferring data at the maximum transfer speed, thereby leaf nodes can be successfully eliminated.

As mentioned above, the invention according to Japanese Patent Laid-Open Publication NO. 2006-25408 is a technology focusing on increasing the transfer efficiency of each node and eliminating leaf nodes.

However, if N number of distribution trees are generated for N number of nodes, a number of relay destinations of a node becomes N−1, so in reality a plurality of distribution trees overlap, and reciprocating links are generated in all the nodes, where high traffic is generated. As the number of nodes N increases, the number of links between nodes (number of edges in the graph) rapidly increases by the square of N, in other words, this prior art has a problem in terms of scalability (expandability).

Also lately an increase in P2P traffic has become a problem on the Internet, so from this aspect as well, it is desirable to decrease the number of logical links and reduce traffic between sub-networks.

Moreover, this publication indicates a structure to bring out maximum performance by sending the next data to a node which finished relaying, therefore it is difficult to estimate how much communication traffic is generated in each link.

In order to handle the above mentioned P2P traffic problem on the Internet, it is desirable to estimate or control traffic between logical links.

SUMMARY

With the foregoing in view, it is an object of the present invention to provide a data distribution system to generate connection paths so that the number of distribution trees and the number of connection nodes of each node become sufficiently small without depending on the number of nodes N.

Accordingly, it is an object of the invention to provide a data distribution system for relaying distribution data via communication among a plurality of nodes on a network. The data distribution system has a management device, which includes a node bandwidth information acquisition unit to acquire and hold information on data transmission-enabled bandwidth of each of the plurality of nodes on the network; a content rate acquisition unit to acquire and hold a bandwidth for content to be distributed; a bandwidth splitting information acquisition unit to acquire and hold bandwidth splitting information, which is a splitting ratio to split the content to be distributed into a plurality of bandwidths; and a connection destination decision unit to determine a connection destination of the content to be distributed, which is split based on the bandwidth split information being held in the bandwidth splitting information acquisition unit, and wherein the connection destination decision unit splits the distribution data transfer bandwidth based on the bandwidth splitting information, and splits a respective data transmission bandwidth of the plurality of nodes in use of the split transfer bandwidth as a unit, and selects a node which can secure the bandwidth unit for each of the split transfer bandwidth as a connection destination to determine a distribution path of the distribution data.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

BRIEF DESCRIPTION OF DRAWINGS

FIG. 9 is a table depicting the held degrees of each node in the state of the paths generated in FIG. 8;

FIG. 10 is a table depicting the separated and updated held degrees of each node shown in FIG. 9;

DESCRIPTION OF EMBODIMENTS

Figure 2:
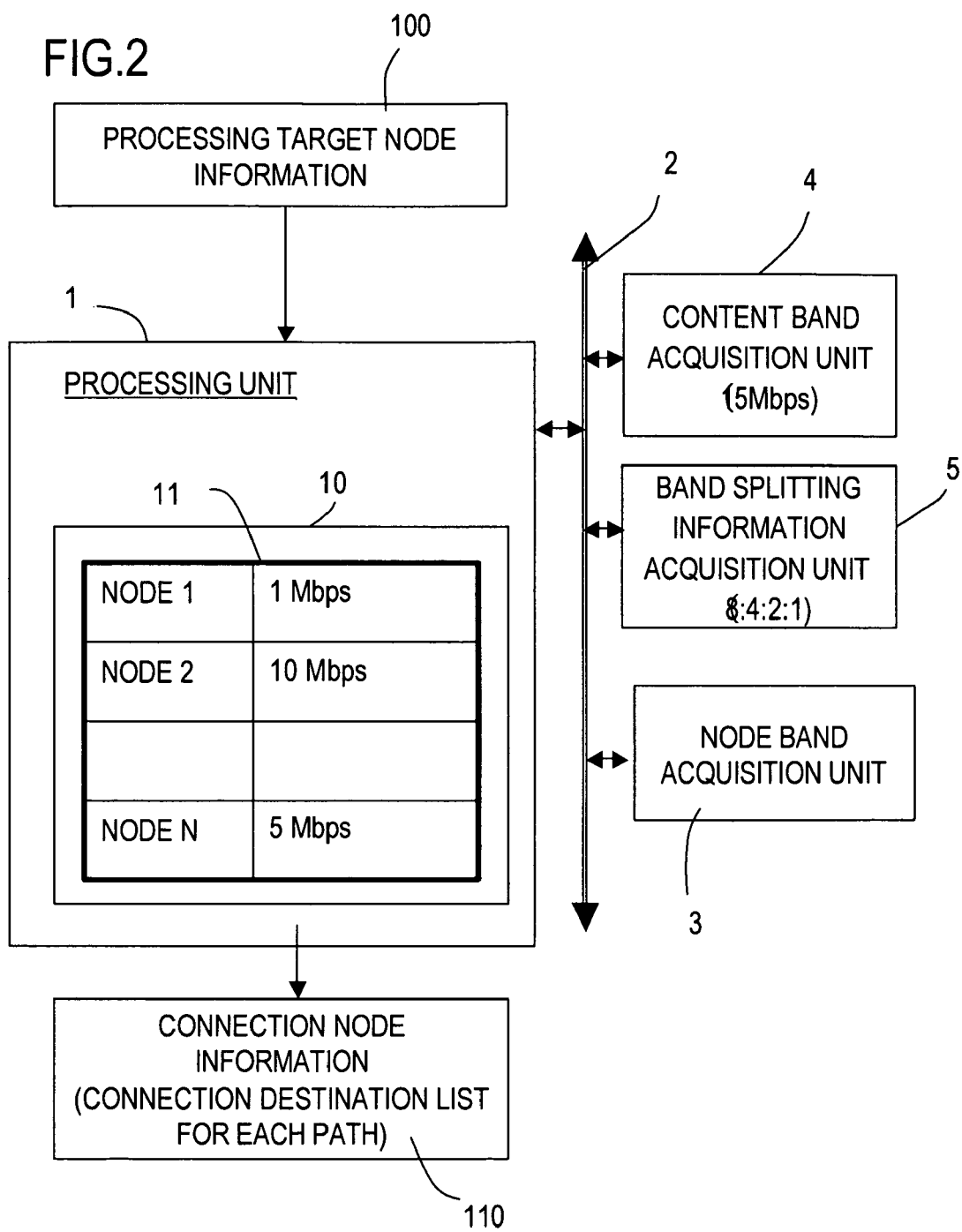
FIG. 2 is a diagram depicting a general configuration of a manage device according to the present invention.

FIG. 2 is a diagram depicting a general configuration of a data distribution system for setting paths among a plurality of nodes constituting a network according to the present invention.

This data distribution system is positioned as a management device for managing the entire network, separately from the plurality of nodes.

This data distribution system may also have a configuration where such a management device is disposed in one node which becomes a transmission source of the distribution data.

The later described functions executed in each composing element of the management device may be implemented by programs.

This data distribution system has a processing unit 1 as a central functional unit. The processing unit 1 is connected, via a bus 2, with a node bandwidth acquisition unit 3 of each node which acquires the data transfer performance of each node, a content rate acquisition unit 4 which acquires a transfer rate (distribution bandwidth) of the distribution data (content), and a bandwidth splitting information acquisition unit 5 which acquires information to split the distribution data.

A bandwidth of each node in the node bandwidth acquisition unit 3, bandwidth splitting information in the bandwidth splitting information acquisition unit 5, and distribution data transfer bandwidth in the content rate acquisition unit 4 are set by default in the management device when the communication system is constructed.

The processing unit 1 has a connection destination decision unit 10 to select a communication candidate between terminals based on the information on each of these units.

This connection destination decision unit 10 includes a control unit, such as a CPU, and operates as a function unit to execute processing to be described herein below, by the execution of programs.

The communication destination decision unit 10 splits the distribution data transfer bandwidth acquired by the content rate acquisition unit 4 based on the bandwidth splitting information acquired by the bandwidth splitting information acquisition unit 5 (step S1).

The connection destination decision unit 10 also acquires the transfer bandwidth information for each node from the node bandwidth acquisition unit 3, and holds the node list 11.

A new processing target node information 100 is added, and paths are set again.

For the processing target node 100, a connection destination list is generated based on a conventional list, and after the connection destination is determined (or after connection), the information on this new node is added to update the node list 11, and this connection destination decision processing ends.

Then the transmission bandwidth of the terminal (node) registered in the node list 11 is split by a degree of which unit is a respective bandwidth width resulting after the above mentioned split (step S2).

For each of the above mentioned split transfer bandwidths, a terminal, with which a corresponding unit (degree) based on the node list 11 can be secured, is selected as the connection destination (step S3).

By repeating this procedure for a number of split transfer bandwidths (step S4), a new node is connected to all the distribution trees, and the connection node information 110 for each path is output as the connection node information.

If there is no node with which a degree can be secured, a degree of a wider bandwidth is split to a degree of a narrower bandwidth to secure a degree. Or if there is no node with which a degree can be secured, a degree of a narrower bandwidth is combined to secure a degree (step S5).

Figure 1:
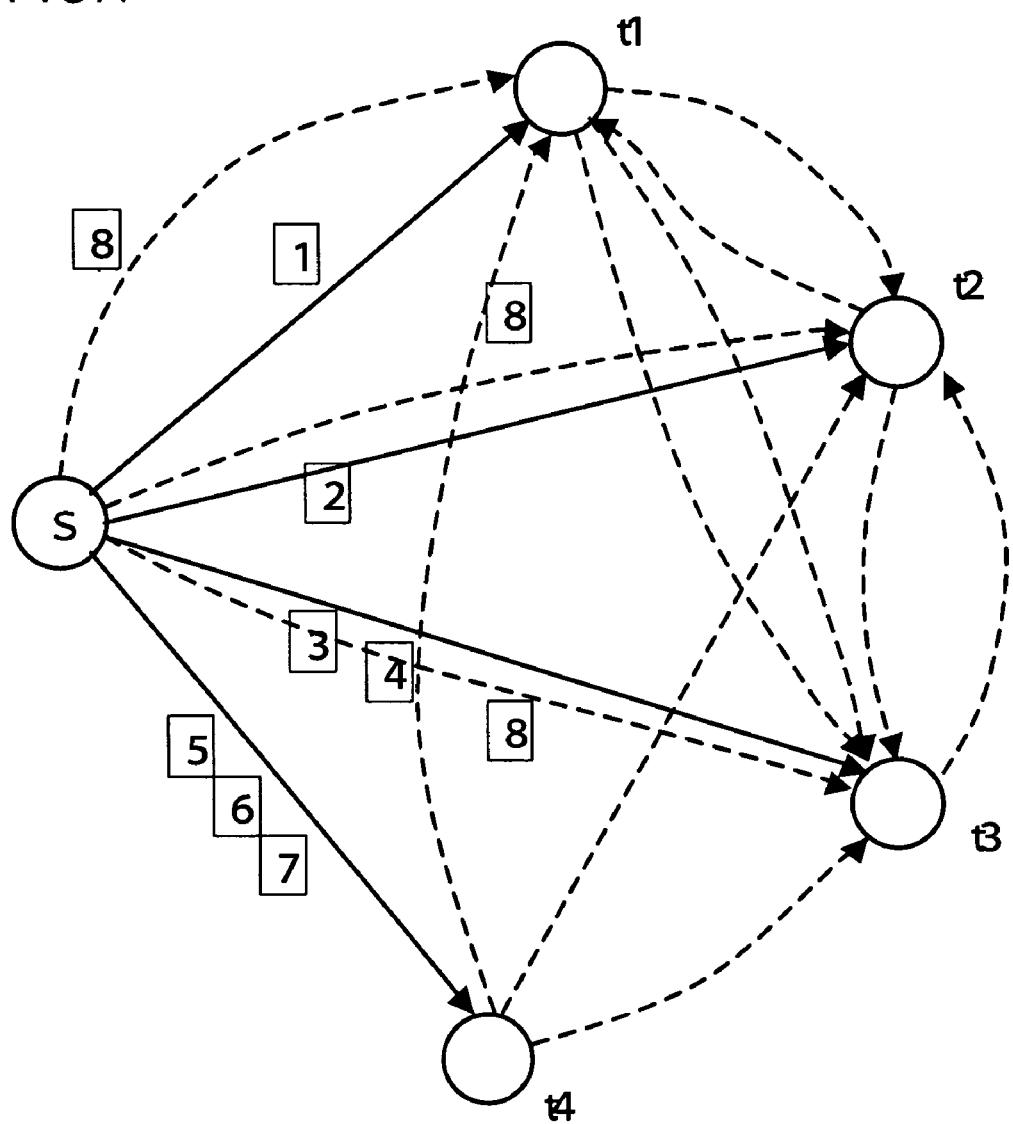
FIG. 1 is a diagram depicting the invention of Japanese Patent Application Laid-Open NO. 2006-25408.

If a plurality of targets to secure a degree exist in the above processing, a node of which physical distance is closest becomes a candidate, so as to suppress influence on the physical network environment. As shown in the diagram depicting the invention of Japanese Patent Application Laid-Open NO. 2006-25408 in FIG. 1, in the case of the invention of Japanese Patent Application Laid-Open NO. 2006-25408, paths are generated equally in all the nodes, and the data volume that flows through all nodes is dynamically distributed according to the capacity of each node, whereby real-time distribution is implemented as a result.

Because of this, the total number of links between nodes increases radically, by squaring, as the number of nodes increases, and it is impossible to estimate how much traffic is generated in each link.

Whereas in the case of the configuration and processing procedure of the above mentioned embodiment of the data distribution system, which has the node bandwidth acquisition unit 3, content rate acquisition unit 4 and bandwidth splitting information acquisition unit 5, a bandwidth of each node is known based on this information, by which the content rate is split, then a degree according to the split bandwidth is determined for each node, and a connection destination is determined using this degree. And as a result, the bandwidth usage efficiency of each node is improved.

The number of trees of the paths is sufficiently small, since this is a number of splits of the content rate, does not depend on the number of nodes N, and a number of connection destinations of each node is also determined by the degree of the node, and is sufficiently small, hence the number of logical links can be reduced without depending on N.

If the split ratio of the content is a geometric ratio, as in the later mentioned setup example, the degree which the node has can be split or combined, so more flexible allocation is possible, and the bandwidth usage efficiency of the node can be improved.

When there are a plurality of connection candidates, priority is determined based on the physical network information, therefore the nodes to be connected can more likely stay close to each other in the network, and network traffic between sub-nets can be decreased. Also a path of which bandwidth is determined is systematically distributed, so traffic between nodes can be controlled.

Now concrete setup examples executed by the is connection destination decision unit 10 in the processing unit 1, based on the configuration of the embodiment of the data distribution system shown in FIG. 2, will be described.

In the setup examples to be described herein below, a terminal is shown as a circular node, and a connection link between terminals is shown as an arrow. The direction of an arrow is a direction of data flow. A number in the circle is the bandwidth of the node, and a number attached to the arrow is a bandwidth of the link, and every time a link is generated, the bandwidth corresponding to the link is allocated out of the bandwidth of the node.

Figures 3, 4:
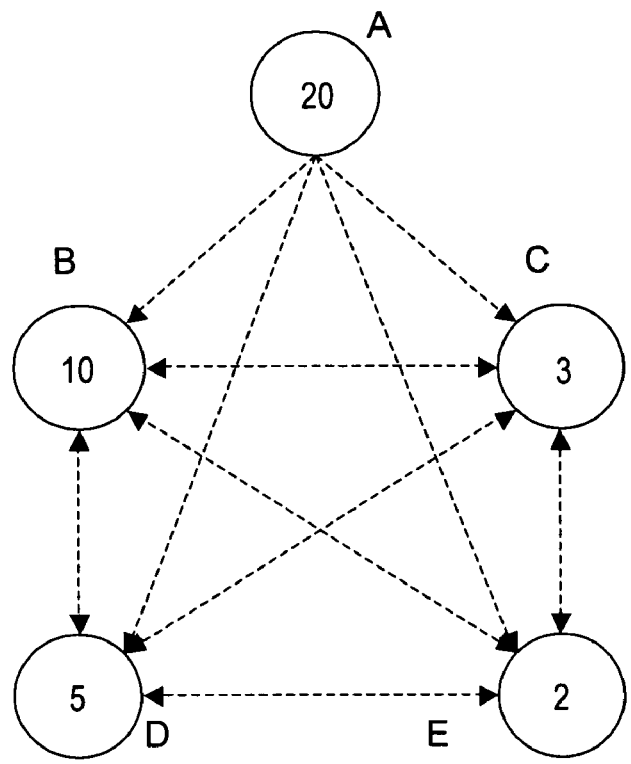
FIG. 3 shows the first network path setup example.
FIG. 4 shows an example depicting a state expressed as a table, which is stored in a part of the node list of the connection destination decision unit in the first network path setup example.

In the case of the first network path setup example shown in FIG. 3, a network consists of five nodes (A, B, C, D and E).

A case of generating paths when data is distributed from node A in this five node group constituting the network will be described.

It is assumed that the bandwidth of the transmission target content, which the content rate acquisition unit 4 acquired, is 10 Mbps, and splitting information which the bandwidth splitting information acquisition unit 5 acquired is four splits in a relationship of 1:2:3:4.

In this case, 10 Mbps is split into four, that is 1 Mbps, 2 Mbps, 3 Mbps and 4 Mbps, according to the bandwidth splitting information.

On the other hand, it is assumed that the initially held transfer bandwidth information of each node acquired by the node bandwidth information acquisition unit 3 is 20 Mbps for node A, 10 Mbps for node B, 3 Mbps for node C and 5 Mbps for node D, and 2 Mbps for node E, as shown in FIG. 3. The bandwidth of each node is separated according to the following polynomial (Expression 1), with four split bandwidths being coefficients.

$$X = 4X_3 + 3X_2 + 2X_1 + 1X_0 \quad \text{(Expression 1)}$$

Here, Xn is a degree which can be connected in each bandwidth, and is a 0 or higher positive integer. For example, 20 Mbps held by node A is separated by allocating degrees from a higher coefficient, as shown in (Expression 2).

$$20 = 4x_5 + 3X0 + 2X0 + 10 \quad \text{(Expression 2)}$$

Each of the other nodes is also separated in the same manner, and a state expressed as a table, which is stored in a part of the node list 11 of the connection destination decision unit 10 is shown in the example in FIG. 4.

In this setup example, a path is generated in each data bandwidth resulting after splitting the content rate, and each of all the nodes is connected to each path without overlapping. Thereby each node can receive a distribution data without excess or deficiency.

First a path generation to distribute 4 Mbps data is described. As the table in FIG. 4 shows, nodes holding a degree of 4 Mbps are node A holding 5 degrees, which is the distribution source, node B holding 2 degrees, and node D holding 1 degree, a total of 8 degrees.

On the other hand, an arbitrary 4 out of 8 degrees are selected since 4 nodes, B, C, D and E, receive the data in this node group. In order to utilize the transmission performance of the node group as much as possible, other than the distribution source, priority is assigned to securing degrees from nodes other than node A. As a result, 1 degree is secured from node A, 2 degrees from node B and 1 degree from node D, a total of 4 degrees are secured.

Using these secured degrees, a link is generated from 1 degree of the transmission source to node B, of which degree is higher among the nodes having secured degrees. Then 2 degree of node B is connected to node D holding degree 1. By this, there are no more nodes having a secured degree for 4 Mbps data distribution, so a link to connect node B to node C, and a link to connect node D to node E are generated, regarding the nodes not having degrees, that is nodes C and E, as leaf nodes.

Figures 5, 6:
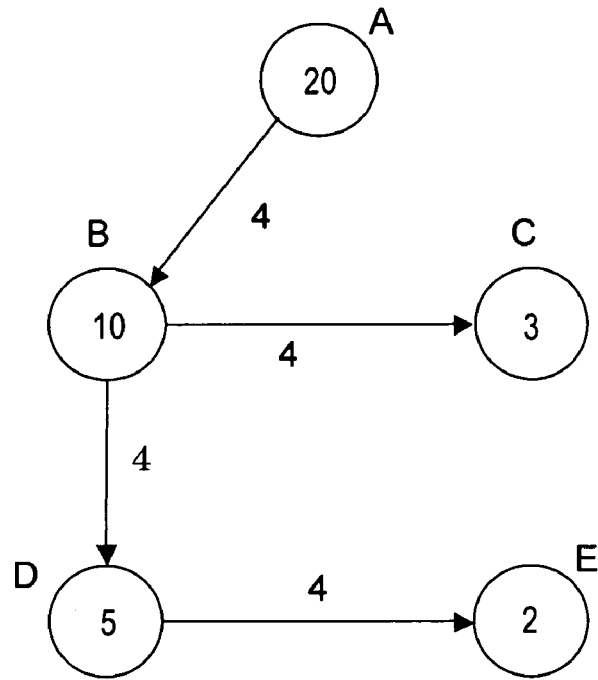
FIG. 5 shows the paths generated for 4 Mbps in the first network path setup example.
FIG. 6 is a table depicting the held unit (degrees) of each node in the state of the paths generated in FIG. 5.

The paths connected in this way are shown in FIG. 5.

By the path generation thus far for a 4 Mbps bandwidth, node A takes 1 degree, node B takes 2 degrees and node D takes 1 degree. As a result, the held degrees are updated as in table in FIG. 6. In other words, nodes B and D no longer have a degree for the 4 Mbps bandwidth, and node A has 4 degrees for the 4 Mbps bandwidth.

This path generation is repeated for each bandwidth, but in the updated state in FIG. 6, in the subsequent 3 Mbps, only node C has 1 degree.

Figures 7, 8:
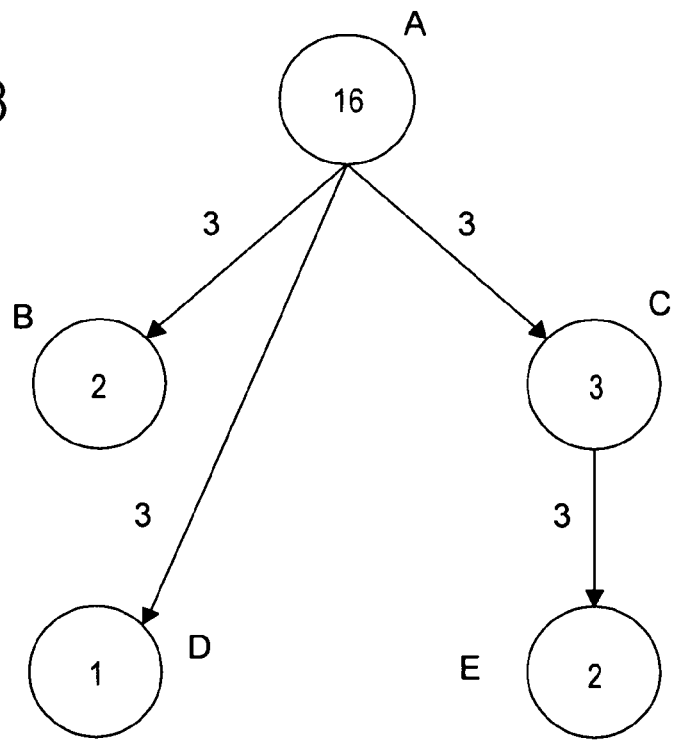
FIG. 7 is a table depicting the separated and updated held degrees of each node shown in FIG. 6.
FIG. 8 shows the paths generated for 3 Mbps in the first network path setup example.

In this case, degrees of a wider bandwidth, that is 4 degrees held by node A for 4 Mbps, are separated, so that 4 or more degrees can be secured for 3 Mbps, as shown in the table in FIG. 7.

As a result, the paths for 3 Mbps are completed as shown in FIG. 8, and the remaining degrees are updated again, as shown in FIG. 9.

For the degrees corresponding to 2 Mbps, only 1 is secured in nodes B and E, as reflected in the updated table in FIG. 9. Hence, just like above, 1 degree of 4 Mbps held by node A is separated into 2 degrees of 2 Mbps, and is updated as shown in FIG. 10.

Figures 11, 12:
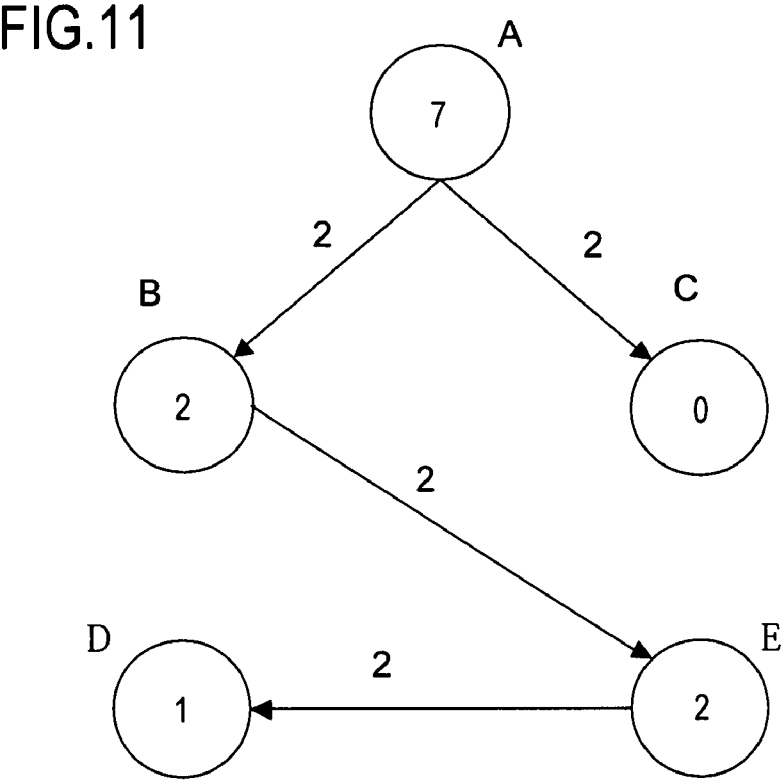
FIG. 11 shows the paths generated for 2 Mbps in the first network path setup example.
FIG. 12 is a table depicting the held degrees of each node in the state of the paths generated in FIG. 11.

Based on the updated degrees in FIG. 10, paths for 2 Mbps are completed, and the paths are generated as shown in FIG. 11.

FIG. 12 is a table of updated degrees after the 2 Mbps paths are generated.

Figures 13, 14:
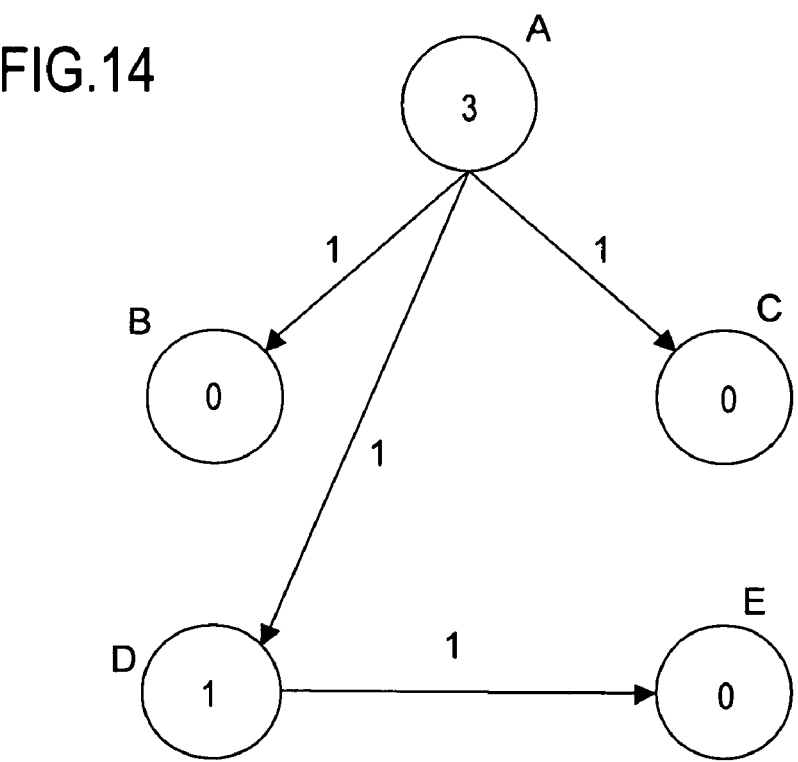
FIG. 13 is a table depicting the separated and updated held degrees of each node shown in FIG. 12.
FIG. 14 shows the paths generated for 1 Mbps in the first network path setup example.

Then 1 Mbps paths are set, but 1 degree of 1 Mbps is secured only for node D, as shown in FIG. 12. So 1 degree of 3 Mbps of node A is separated and changed, as shown in FIG. 13.

Thus 3 degrees are secured for node A, and 1 degree is secured for node D. Based on this, 1 Mbps paths are set, as shown in FIG. 14.

Figures 15, 16:
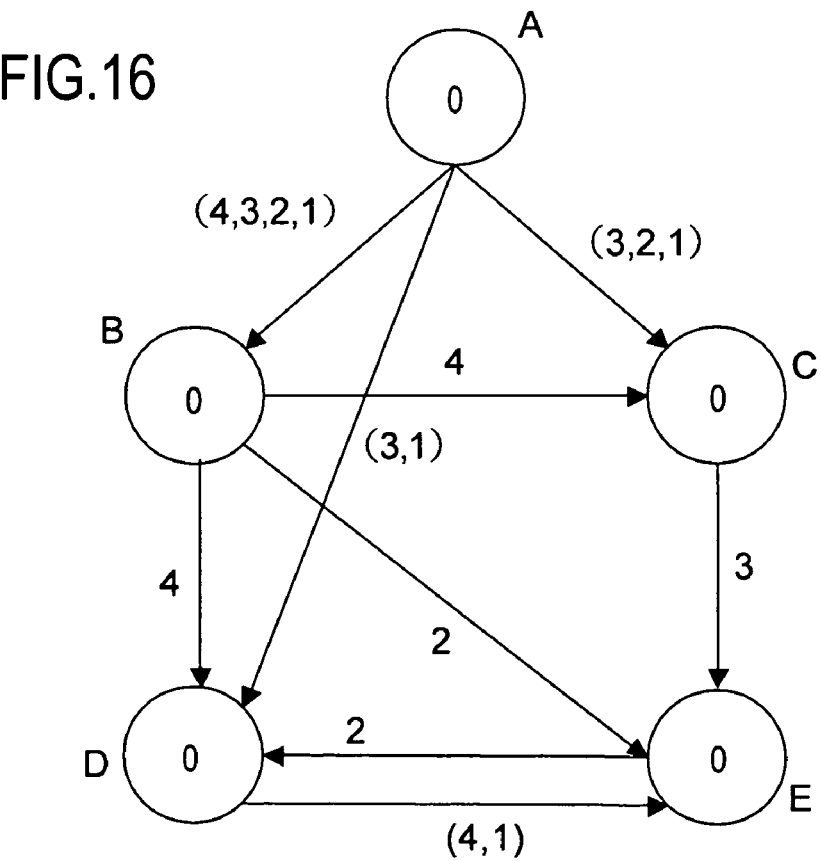
FIG. 15 is a table depicting the held degrees of each node in the state of the paths generated in FIG. 14.
FIG. 16 shows an example of combining the held degrees in the state when paths are completed the setup in the first network path setup example.

As a result, the held degrees can be incorporated for all nodes, as shown in FIG. 15.

By superimposing the paths which are set for all the bandwidths of 4 Mbps, 3 Mbps, 2 Mbps and 1 Mbps as above, all paths are generated, as shown in FIG. 16.

In the case of this first setup example, the content rate is 10 M bps, and the transfer performance of the nodes is 2 to 20 Mbps. If the difference of node performance increases, performing more efficient content splitting should be more advantageous. The following is a setup example of performing more efficient content splitting in such a case.

In order to split and combine the bandwidths more efficiently, it is advantageous to make the split ratio of a bandwidth a geometric ratio.

By making the split ratio of a bandwidth a geometric ratio, such as 1:2:4:8 . . . , efficient allocation is possible without generating a remainder when a degree is split or when degrees are combined.

When splitting into several paths, for example, the splitting number is determined without depending on the number of nodes N, and becomes the number of paths of the present invention. For the split ratio, it is more effective, as mentioned later, to change the ratio than to split equally.

An example of making the split ratio of a bandwidth a geometric ratio will now be described as a second setup example.

Figures 17, 18:
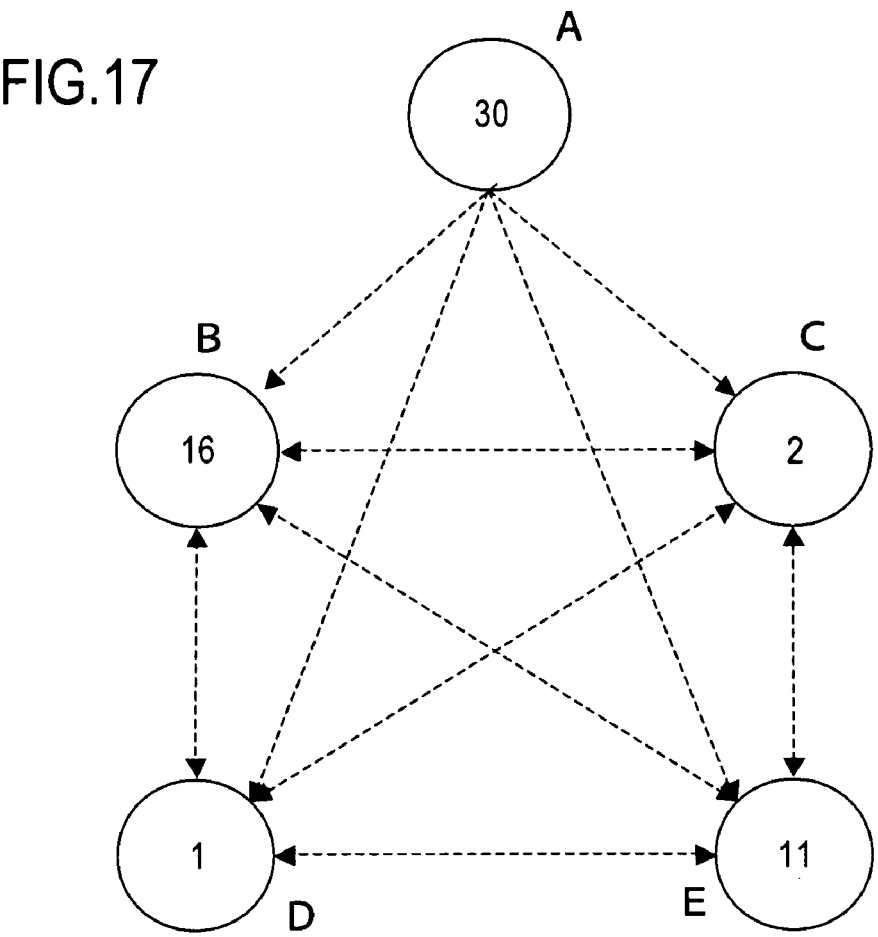
FIG. 17 shows a second setup example.
FIG. 18 shows an example depicting a state expressed as a table, which is stored in a part of the node list of the connection destination decision unit in the second network path setup example.

In the second setup example shown in FIG. 17 and FIG. 18 as well, a terminal is shown as a circular node, and a connection link between terminals is shown as an arrow. The direction of the arrow is a direction of the data flow. A number in the circle is a bandwidth of the node, and a number attached to the arrow is a bandwidth of the link, and every time a link is generated, the bandwidth corresponding to the link is allocated out of the bandwidth of the node.

In the second setup example shown in FIG. 17, a network consists of 5 nodes (A, B, C, D and E), just like the first setup example. For the node group, a path generation in the case of distributing data from node A is described. It is assumed that the bandwidth of the transmission target content, which the content rate acquisition unit 4 acquired, is 15 Mbps, and the splitting information, which the bandwidth splitting information acquisition unit 5 acquired is 4 splits in a geometric ratio relationship of 1:2:4:8 ($=2^0:2^1:2^2:2^3$).

At this time, the connection destination decision unit 10 splits the 15 Mbps content rate into 4, that is, 1 Mbps, 2 Mbps, 4 Mbps and 8 Mbps.

On the other hand, it is assumed that the initially held transfer bandwidth of each node acquired by the terminal bandwidth acquisition unit 3 is 30 Mbps for node A, 16 Mbps for node B, 2 Mbps for node C, 1 Mbps for node D and 11 Mbps for node E, as shown in FIG. 17.

The bandwidth of each node is separated according to the following polynomial (Expression 3), where the split 4 bandwidths are coefficients.

$$X=8X3+4X2+2X1+1X0 \qquad \text{(Expression 3)}$$

Here Xn is a degree which can be connected in each bandwidth, and is 0 or a higher positive integer.

For example, 30 Mbps held by node A is separated as the following polynomial (Expression 4).

$$30=8X3+4X1+2X1+1X0 \qquad \text{(Expression 4)}$$

Each of the other nodes in the example in FIG. 17 is also separated in the same manner as shown as a table in FIG. 18.

In this setup example as well, a path is generated in each split bandwidth respectively, and each of all the nodes is connected to each path without overlapping. Whereby each node can receive the distribution data without excess or deficiency.

First a path generation to distribute 8 Mbps data is described. As the table in FIG. 18 shows, nodes holding a degree (that is, the number of paths that can output) of 8 Mbps are node A holding 3 degrees, which is the distribution source, node B holding 2 degrees, and node E holding 1 degree, a total of 6 degrees.

On the other hand, an arbitrary 4 out of 6 degrees are selected, since 4 nodes, B, C, D and E, receive the data in this node group.

In order to utilize the transmission performance as much as possible of the node group other than the distribution source, priority is assigned to securing degrees from the nodes other than node A. As a result, 1 degree is secured from node A, 2 degrees from node B, and 1 degree from node E, a total of 4 degrees are secured.

Using these secured degrees, a connection link is generated first from the transmission source node A to the nodes having secured degrees, that is, nodes B and E, with priority. If there are a plurality of nodes holding secured degrees, such as nodes B and E, then node B, which is a node having more degrees, has priority.

When there are no more nodes holding a secured degree, nodes not holding a degree, nodes C and D in this case, are connected as leaf nodes. The paths connected in this way are shown in FIG. 19.

By the path generation thus far, nodes A, B and E take the degrees for the 8 Mbps bandwidth. In other words, node A takes 1 degree, node B takes 2 degrees and node E takes 1 degree.

Figures 19, 20:
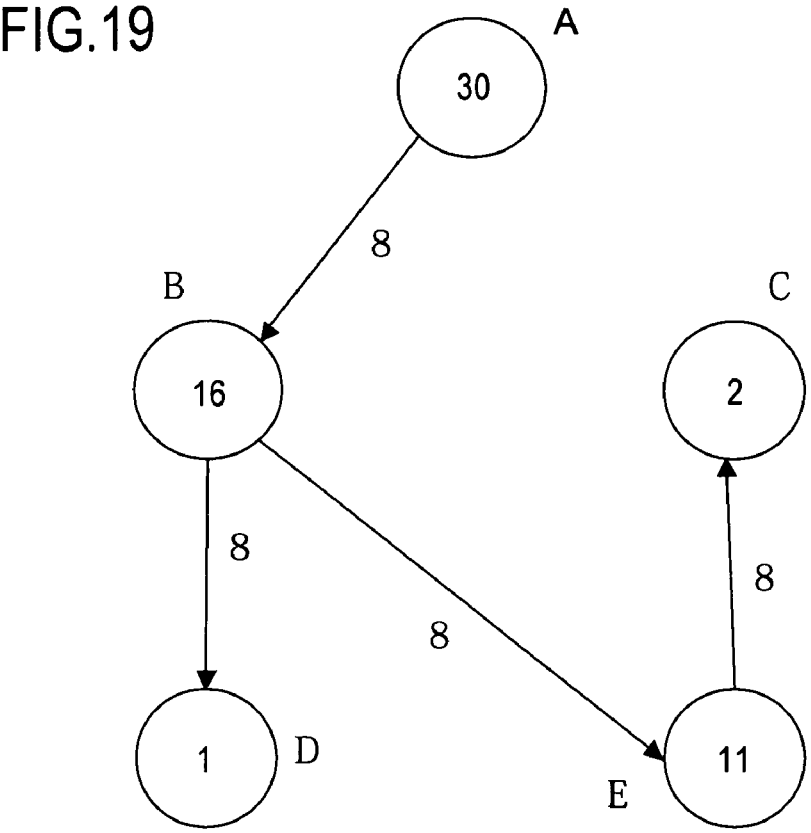
FIG. 19 shows the paths generated for 8 Mbps in the second network path setup example.
FIG. 20 is a table depicting the held degrees of each node in the state of the paths generated in FIG. 19.

Therefore the held degrees are updated as shown in the table in FIG. 20. In other words, nodes B and E no longer have degrees for the 8 Mbps bandwidth, and node A holds 2 degrees for the 8 Mbps bandwidth.

By repeating the above path generation for each bandwidth, all paths are generated.

For example, a path generation for 4 Mbps is the same as the case of 8 Mbps, and 4 degrees, corresponding to the 4 Mbps bandwidth, are secured out of the held degrees shown in the table in FIG. 20, so as to be sent to 4 nodes. However, in some cases only 1 degree held by node A may be secured for the 4 Mbps bandwidth, as shown in FIG. 20.

If the target number of degrees cannot be secured in this way, degrees for a wider bandwidth, in this case degrees of the 8 Mbps bandwidth held by node A, are split. If 2 degrees for 8 Mbps are split, 4 degrees for 4 Mbps can be secured, so node A holds a total of 5 degrees for the 4 Mbps bandwidth as a result, and the target 4 degrees are secured from here.

Figures 21, 22:
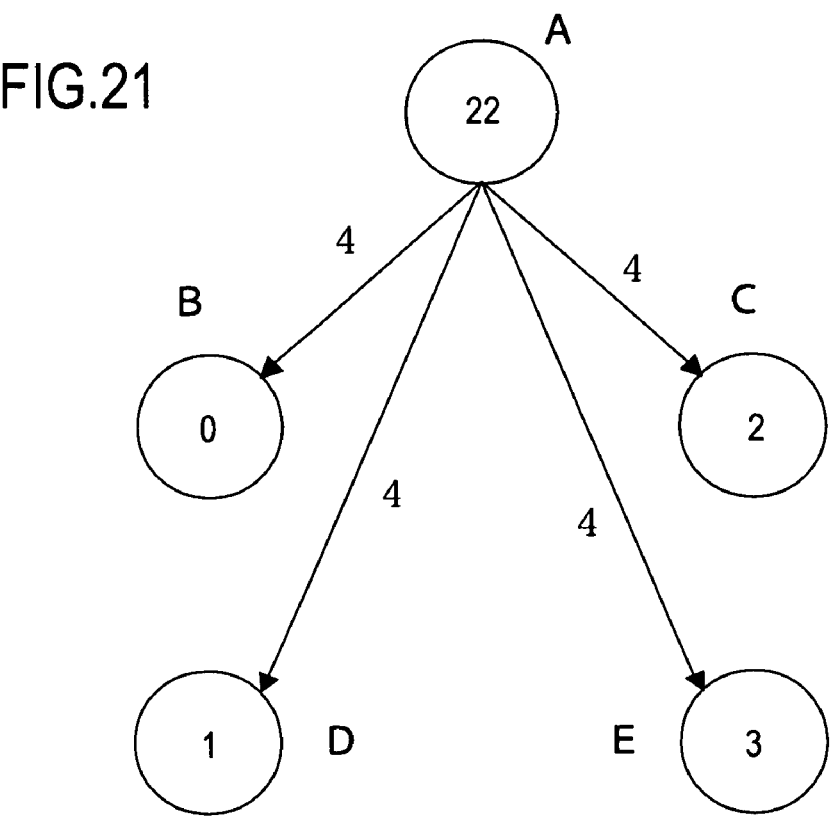
FIG. 21 shows the paths generated for 4 Mbps in the second network path setup example.
FIG. 22 is a table depicting the held degrees of each node in the state of the paths generated in FIG. 21.

As a result, paths for 4 Mbps are completed as shown in FIG. 21, and the remaining degrees are updated again. This processing is repeated for 2 Mbps and 1 Mbps as well.

Figure 23:
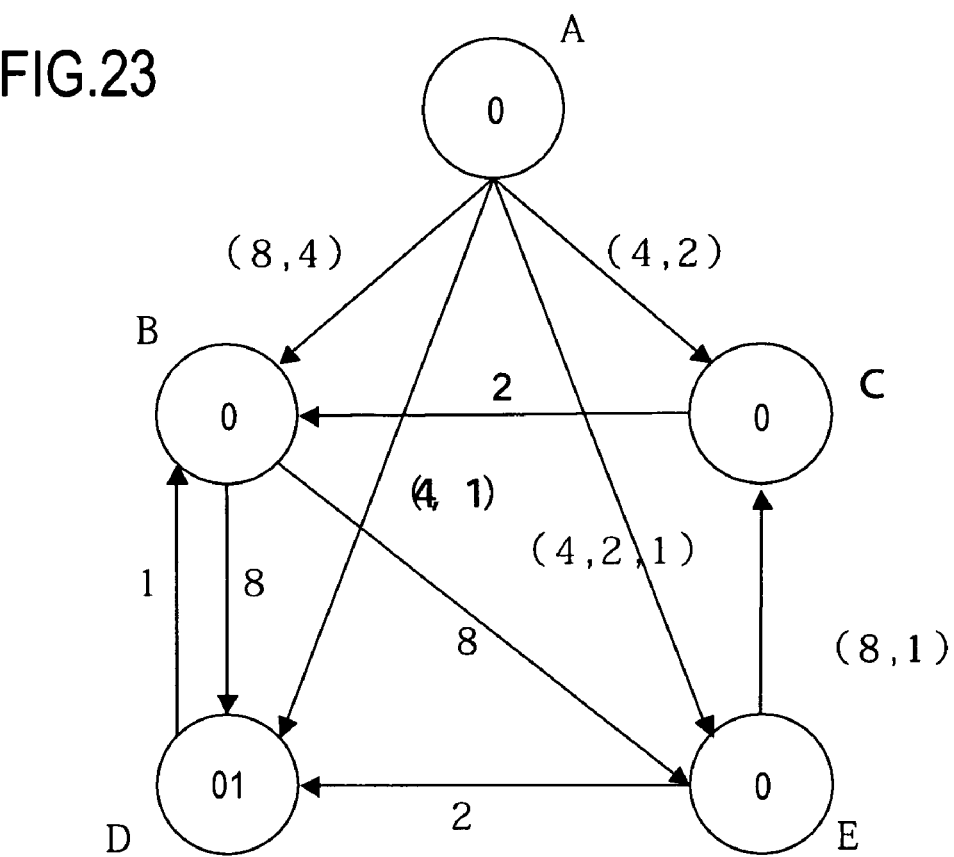
FIG. 23 shows an example of combining the held degrees in the state when paths are completed the setup in the second network path setup example.

Finally, the paths in FIG. 23 are completed is utilizing degrees efficiently, as shown in FIG. 22. FIG. 23 are paths completed by superimposing the paths generated for each bandwidth, and when actual real-time data is distributed, a complicated data transfer like this is performed.

In a node group, where nodes with various transfer capabilities, coexist, paths can be generated, utilizing the transfer capability of each node efficiently, by the present invention.

In the above description, an example of generating the connection links of all the nodes simultaneously for the node group of nodes A, B, C, D and E was described, but the connection link may be generated for 1 node at a time.

Now a case of adding a new node to the network, in which paths have already been generated, will be described.

For a processing target node 100, a connection destination list is generated based on a conventional list, and after the connection destination is determined (or after connection), the information of this new node is added to update the node list 11, and path generation ends.

Figure 24:
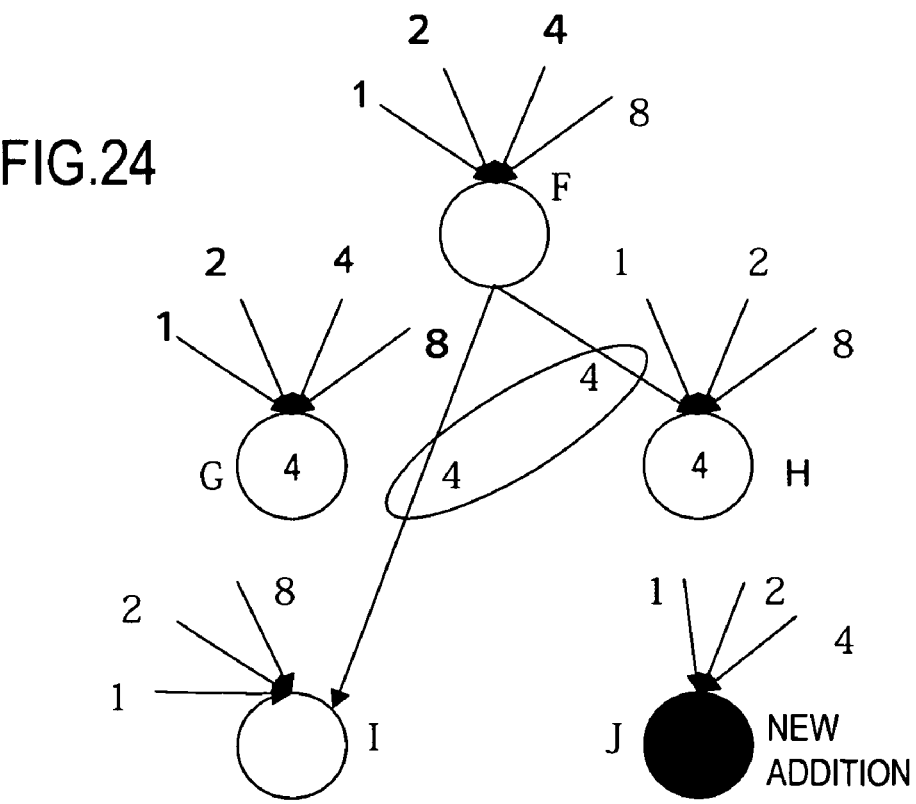
FIG. 24 shows an example when a part of a node group, of which paths have already been set, is extracted.

FIG. 24 shows an example when a part of a node group, of which paths have already been set, is extracted. For nodes F, G, H and I, paths have already been determined, and connection has been completed with the paths for each bandwidth.

A case of adding new node J to this state will be described. In this example, node J can secure a degree from one of the nodes of the node group, for each of 1, 2 and 4 Mbps bandwidths, but no degree remains for the 8 Mbps bandwidth. This state tends to occur if adding and deleting nodes are repeated.

In the case of node F, degrees of 8 Mbps were split into two 4 Mbps degrees, which are distributed to nodes H and I respectively.

So there is an attempt to combine these degrees. But before combining, the latest table is searched to find out if degrees for 4 Mbps could be secured from other nodes, and it is determined that 1 degree held by nodes G and H can be replaced.

If replacement is possible, 2 degrees for 4 Mbps are returned to node F, and for nodes H and I which returned the degrees, a path is generated from the degrees of 4 Mbps held by nodes G and H. In node F, on the other hand, the returned 2 degrees for 4 Mbps are combined to 8 Mbps, and are used for path generation for node J.

Figure 25:
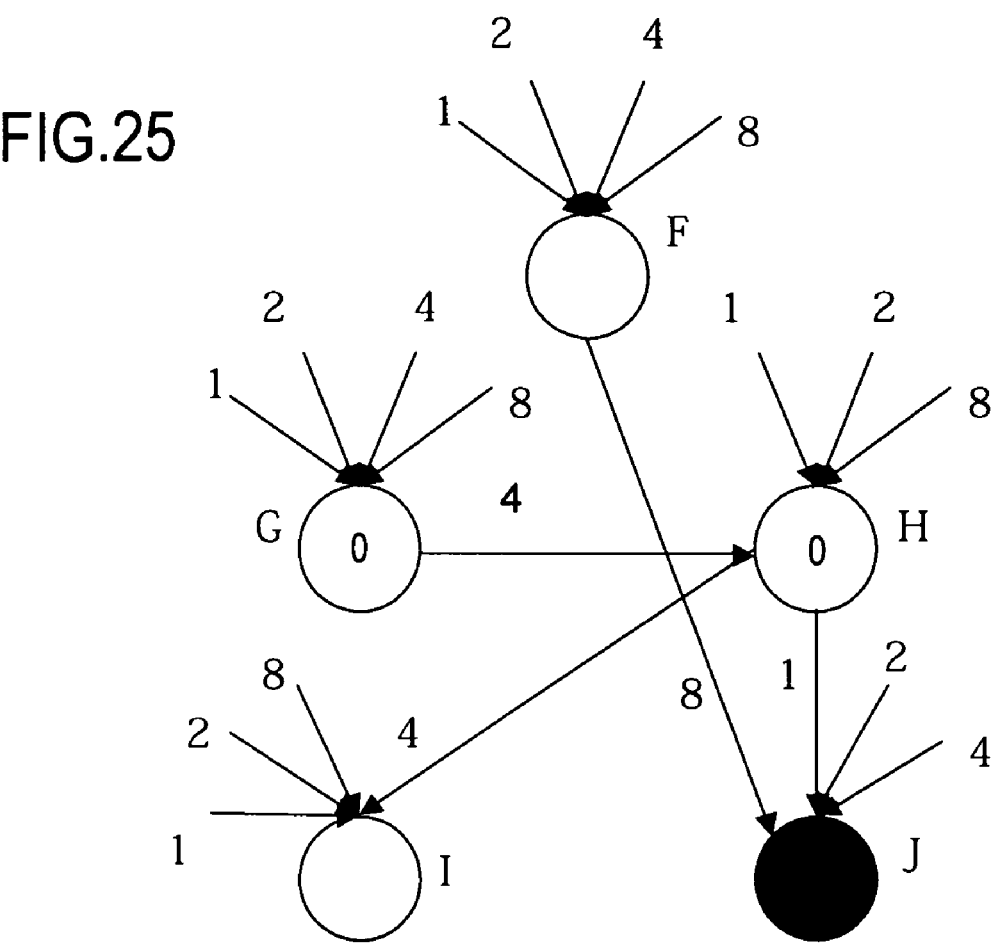
FIG. 25 shows the state when paths are set again after a node is added.

FIG. 25 shows the state when paths are set again after a node is added.

As FIG. 25 shows, the flexibility of efficiency of path generation, based on the splitting and combining of degrees between bandwidths, can be improved without generating remainders by making the splitting ratio of the content rate a geometric ratio.

If there are a plurality of nodes holding degrees for a target bandwidth to be secured, the gateways of sub-net or the addresses of a sub-net to which the nodes belong, for example, are collected from the terminal bandwidth acquisition unit 3 as network information, and a terminal, of which this information matches, is selected with priority.

As described above, the present invention can decrease the number of logical links without depending on the number of nodes N. If a geometric ratio is used for the splitting ratio of the content, a more flexible allocation becomes possible, and the bandwidth utilization efficiency for the nodes can be improved.

Also the nodes to be connected can be kept close in the network, and the network traffic between sub-nets can be decreased. Since a path of which bandwidth is determined is systematically distributed, the traffic between nodes can be kept under control. Because of these effects, the present invention can contribute to the industry.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A data distribution computer system for relaying distribution data between a plurality of nodes on a network, comprising:
   a management device configured to:
   acquire and hold information set by default on data transmission-enabled bandwidth of each of the plurality of nodes on the network;
   acquire and hold a transfer bandwidth set by default for content to be distributed;
   acquire and hold transfer bandwidth splitting information set by default, which is a splitting geometric ratio to split the content to be distributed into a plurality of transfer bandwidths; and
   determine a connection destination of the content to be distributed, which is geometric split based on the transfer bandwidth split information,
   wherein the acquired transfer bandwidth for the content to be distributed is split in a geometric ratio relationship based on the acquired transfer bandwidth splitting information, and a respective acquired data transmission bandwidth of the plurality of nodes in use of the split transfer bandwidth is split as a unit, and a node which can secure the bandwidth unit for each split transfer bandwidth as a connection destination is selected to determine a distribution path of the distribution data.

2. The data distribution system according to claim 1, wherein when a distribution path of the distribution data is determined, a unit of a bandwidth wider than a bandwidth of a predetermined unit is split so as to secure the unit.

3. The data distribution system according to claim 1, wherein when a distribution path of the distribution data is determined, units of a bandwidth narrower than a bandwidth of a predetermined unit are combined so as to secure the unit.

4. The data distribution system according to claim 1, wherein when a plurality of nodes, which can be selected as a connection destination to secure the unit, exist, a priority in selection of the plurality of nodes is determined according to network conditions.

5. The data distribution system according to claim 1, wherein the management device is disposed independently from the plurality of nodes.

6. The data distribution system according to claim 1, wherein the management device is disposed in one of the plurality of nodes.

7. A management device disposed in a data distribution system for relaying distribution data between a plurality of nodes on a network, the management device comprising:
a processing device to:
acquire and hold information set by default on data transmission-enabled bandwidth of each of the plurality of nodes on the network;
acquire and hold a transfer bandwidth set by default for content to be distributed;
acquire and hold transfer bandwidth splitting information set by default, which is a geometric ratio to split the content to be distributed into a plurality of transfer bandwidths; and
determine a connection destination of the content to be distributed, which is split in a geometric ratio relationship, based on the transfer bandwidth split information,
wherein the acquired transfer bandwidth for the content to be distributed is split in a geometric ratio relationship based on the acquired transfer bandwidth splitting information, and a respective data transmission bandwidth of the plurality of nodes in use of the split transfer bandwidth is split as a unit, and a node which can secure the bandwidth unit for each split transfer bandwidth as a connection destination is selected to determine a distribution path of the distribution data.

8. The management device according to claim 7, wherein when a distribution path of the distribution data is determined, a unit of a bandwidth wider than a bandwidth of a predetermined unit is split so as to secure the unit.

9. The management device according to claim 7, wherein when a distribution path of the distribution data is determined, units of a bandwidth narrower than a bandwidth of a predetermined unit are combined so as to secure the unit.

10. The management device according to claim 7, wherein when a plurality of nodes, which can be selected as a connection destination to secure the unit, exist, a priority in selection of the plurality of nodes is determined according to network conditions.

11. The management device according to claim 7, wherein the management device is disposed independently from the plurality of nodes.

12. The management device according to claim 7, wherein the management device is disposed in a node which is to be a distribution source of the distribution data.

13. A method for determining connection paths between nodes on a network, based on bandwidths of contents to be distributed, the method comprising:
acquiring a data transmission-enabled bandwidth for each of a plurality of nodes on the network;
acquiring a transfer bandwidth of a content to be distributed on the network;
acquiring transfer bandwidth splitting information, which is a splitting geometric ratio;
splitting the transfer bandwidth of the content, based on the transfer bandwidth splitting information into a plurality of transfer bandwidths;
splitting a respective data transmission-enabled bandwidth of the plurality of nodes in use of the split transfer bandwidth as a unit; and
selecting a node which can secure the bandwidth unit for each split transfer bandwidth as a connection destination to determine a connection path.

* * * * *